US012269626B2

(12) United States Patent
Zhu et al.

(10) Patent No.: US 12,269,626 B2
(45) Date of Patent: Apr. 8, 2025

(54) TAKE-OFF AND LANDING APPARATUS FOR VERTICAL TAKE-OFF AND LANDING AIRCRAFT

(71) Applicant: Ning Zhu, Guangzhou (CN)

(72) Inventors: Ning Zhu, Guangzhou (CN); Xiaoxin Liu, Guangzhou (CN)

(73) Assignee: Ning Zhu, Guangzhou (CN)

( * ) Notice: Subject to any disclaimer, the term of this patent is extended or adjusted under 35 U.S.C. 154(b) by 0 days.

(21) Appl. No.: 18/030,497

(22) PCT Filed: Apr. 19, 2022

(86) PCT No.: PCT/CN2022/087708
§ 371 (c)(1),
(2) Date: Apr. 5, 2023

(87) PCT Pub. No.: WO2023/279804
PCT Pub. Date: Jan. 12, 2023

(65) Prior Publication Data
US 2023/0399131 A1    Dec. 14, 2023

(30) Foreign Application Priority Data
Jul. 8, 2021  (CN) .......................... 202121555356.3

(51) Int. Cl.
*B64U 70/90*   (2023.01)
*B64F 1/02*    (2006.01)
(Continued)

(52) U.S. Cl.
CPC ............... *B64U 70/90* (2023.01); *B64F 1/02* (2013.01); *B64F 1/04* (2013.01); *B64U 70/30* (2023.01); *B64U 10/13* (2023.01)

(58) Field of Classification Search
CPC ........ B64U 70/00; B64U 70/30; B64U 70/90; B64U 80/10; B64F 1/02; B64F 1/04
See application file for complete search history.

(56) References Cited

U.S. PATENT DOCUMENTS 5,464,072 A * 11/1995 Muller ...................... B66B 9/02
                                                    182/12
10,717,528 B1 * 7/2020 Tran ...................... B64U 70/87
(Continued)

FOREIGN PATENT DOCUMENTS

CN     110466749 A    11/2019
CN     210653684 U     6/2020
(Continued)

*Primary Examiner* — Philip J Bonzell
*Assistant Examiner* — Anna L. Gordon
(74) *Attorney, Agent, or Firm* — Weitzman Law Offices, LLC

(57) ABSTRACT

A take-off and landing apparatus for a vertical take-off and landing aircraft is disclosed, including a take-off and landing pole, a mooring transfer base and a sleeve docking device. The top of the take-off and landing pole is provided with a contact head which is elastic. The mooring transfer base is disposed on the take-off and landing pole, the mooring transfer base is movable along the take-off and landing pole, the mooring transfer base is configured to receive the vertical take-off and landing aircraft. The sleeve docking device is disposed on the vertical take-off and landing aircraft, and the sleeve docking device is provided with a docking hole adapted to the take-off and landing pole.

8 Claims, 3 Drawing Sheets

(51) Int. Cl.
B64F 1/04 (2006.01)
B64U 10/13 (2023.01)
B64U 70/30 (2023.01)

(56) References Cited

U.S. PATENT DOCUMENTS

| | | | |
|---|---|---|---|
| 11,667,401 B2 * | 6/2023 | Masuoka | B64U 20/30 244/115 |
| 2016/0376031 A1 * | 12/2016 | Michalski | G08G 5/0013 701/15 |
| 2018/0245365 A1 * | 8/2018 | Wankewycz | B64U 80/30 |
| 2021/0125503 A1 * | 4/2021 | Henry | G08G 5/0021 |
| 2021/0312822 A1 * | 10/2021 | Nakabayashi | B64F 1/222 |
| 2022/0306319 A1 * | 9/2022 | Howe | B64U 70/70 |
| 2024/0124169 A1 * | 4/2024 | Song | B64F 1/02 |

FOREIGN PATENT DOCUMENTS

| | | | | |
|---|---|---|---|---|
| CN | 212501093 U | | 2/2021 | |
| CN | 215554243 U | | 1/2022 | |
| EP | 3597538 A1 | | 1/2020 | |
| KR | 20200015064 A | | 2/2020 | |
| WO | WO-2017145485 A1 * | | 8/2017 | B64C 27/08 |

\* cited by examiner

TAKE-OFF AND LANDING APPARATUS FOR VERTICAL TAKE-OFF AND LANDING AIRCRAFT

CROSS-REFERENCE TO RELATED APPLICATIONS

This application is a national stage filing under 35 U.S.C. § 371 of international application number PCT/CN2022/087708, filed Apr. 19, 2022, which claims priority to Chinese patent application No. 2021215553563 filed Jul. 8, 2021. The contents of these applications are incorporated herein by reference in their entirety.

TECHNICAL FIELD

The disclosure relates to the research field of take-off and landing of aircrafts, and in particular to a take-off and landing apparatus for a vertical take-off and landing aircraft.

BACKGROUND

Urban Air Mobility (UAM) refers to "safe and efficient manned/unmanned (air) vehicle system used for passenger or freight transport in cities". As for the aircrafts currently being developed and demonstrated, UAM focuses on urban or inter-city medium-short distance transportation (3-100 kilometers), flying in ultra-low altitude of less than 100 meters or in 100-1000 meters low altitude airspace. One to two or less than five drivers and passengers (at the current technical level) are in the manned aircraft. Urban flight basically uses pure electric propulsion powered by batteries (lithium or hydrogen fuel cells), and inter-city flight may choose hybrid electric propulsion. Safety, convenience, intelligence, environmental protection (including low noise), diversity and personalized services are the main characteristics expected by people from the UAM.

In the foreseeable future, due to urban congestion and ground space limitation, the UAM may gradually become a mainstream mode of transportation in the urban core areas. However, due to the traditional way of taking off and landing, the UAM needs to use a helicopter landing platform on the building's roof or build independent ground/water landing facilities. Due to the limited land use conditions in the urban central areas, numerous building's roof equipment and limited space, it will be subject to various restrictions of site space conditions if it is required to provide take-off and landing conditions for large-scale eVTOL (Electric Vertical take-off and Landing) aircrafts at the same time.

On the other hand, due to the large air flow and noise generated by the vertical take-off and landing aircraft during the vertical take-off and landing, the surrounding environment may be affected, reducing the use experience. Moreover, the interaction between the air flow and the ground may interfere with the take-off and landing process of the vertical take-off and landing aircraft in turn. Therefore, the existing take-off and landing mode still needs further improvement.

SUMMARY

The disclosure aims at solving at least one of the technical problems in the existing technology. For this purpose, the disclosure provides a take-off and landing apparatus for a vertical take-off and landing aircraft, which can reduce the impact of airflow and noise on the environment during take-off and landing.

The take-off and landing apparatus for a vertical take-off and landing aircraft provided according to the disclosure comprises a take-off and landing pole, a mooring transfer base and a sleeve docking device, wherein a top of the take-off and landing pole is provided with a contact head, the contact head is elastic, the mooring transfer base is disposed on the take-off and landing pole, the mooring transfer base is movable along the take-off and landing pole, the mooring transfer base is configured to receive the vertical take-off and landing aircraft, the sleeve docking device is disposed on the vertical take-off and landing aircraft, and the sleeve docking device is provided with a docking hole adapted to the take-off and landing pole.

The take-off and landing apparatus for a vertical take-off and landing aircraft provided according to the disclosure at least has the following technical efforts. The mooring transfer base firstly moves upward along the take-off and landing pole to receive the vertical take-off and landing aircraft during landing, then the vertical take-off and landing aircraft stops after the completion of receiving, the vertical take-off and landing aircraft is brought by the mooring transfer base to land. The vertical take-off and landing aircraft is transferred to a high place via the mooring transfer base when taking off, and start to take off. By providing the take-off and landing pole and the mooring transfer base, the vertical take-off and landing aircraft can start or stop at a position away from the ground during take-off and landing, thereby reducing the impact of airflow and noise on the environment during take-off and landing.

According to some embodiments of the disclosure, the mooring transfer base and the sleeve docking device are provided with locking mechanisms adapted to each other.

According to some embodiments of the disclosure, the mooring transfer base is provided with a base actuator, and the base actuator is configured to drive the mooring transfer base to move along the take-off and landing pole.

According to some embodiments of the disclosure, the take-off and landing pole is provided with a base guide rail, the mooring transfer base is provided with a friction wheel, the base actuator is connected with the friction wheel in a transmission manner, and the base guide rail is adapted to the friction wheel.

According to some embodiments of the disclosure, the docking hole comprises a guide portion, a pore diameter of the guide portion is greater than a diameter of the take-off and landing pole, and the pore diameter of the guide portion is reduced gradually.

According to some embodiments of the disclosure, the contact head is made of a rubber material.

According to some embodiments of the disclosure, a buffering airbag is used as the contact head.

According to some embodiments of the disclosure, the take-off and landing pole is made of a composite fiber material.

According to some embodiments of the disclosure, the take-off and landing apparatus for a vertical take-off and landing aircraft comprises a main platform and at least one support arm, the support arm is disposed on the main platform, the take-off and landing pole is disposed on the support arm, and the support arm is movable relative to the main platform to enable the take-off and landing pole to get close to or keep away from the main platform.

According to some embodiments of the disclosure, the main platform is provided with a support arm actuator, and the support arm actuator is connected with the support arm.

BRIEF DESCRIPTION OF THE DRAWINGS

The above and/or additional aspects and advantages of the disclosure will be more apparent from the following description of the embodiments in conjunction with the accompanying drawings, wherein.

NUMERAL REFERENCES

Figure 1:
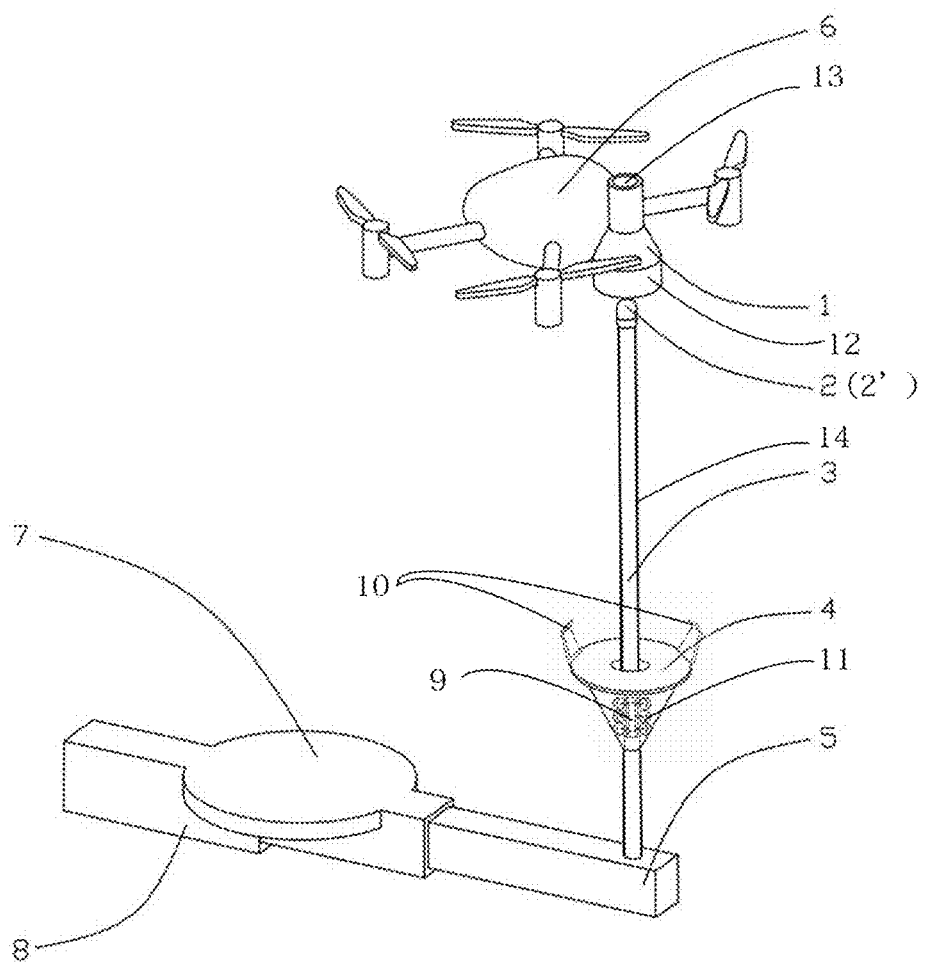
FIG. 1 is an isometric view of a take-off and landing apparatus for a vertical take-off and landing aircraft provided in the disclosure.

1 refers to sleeve docking device, 2 refers to contact head, 2' refers to buffering airbag, 3 refers to take-off and landing pole, 4 refers to mooring transfer base, 5 refers to support arm, 6 refers to vertical take-off and landing aircraft, 7 refers to main platform, 8 refers to support arm actuator, 9 refers to base actuator, 10 refers to locking mechanisms, 11 refers to friction wheel, 12 refers to guide portion, 13 refers to docking hole, 14 refers to base guide rail.

DETAILED DESCRIPTION

The embodiments of the disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are only intended to explain the disclosure, but should not be construed as limiting the disclosure.

In the description of the disclosure, it should be understood that the orientation or position relation related to the orientation description, such as the orientation or position relation indicated by the upper, lower, front, rear, left, right, etc., is based on the orientation or position relation shown in the drawings, which is only used for convenience of description of the disclosure and simplification of description instead of indicating or implying that the indicated device or element must have a specific orientation, and be constructed and operated in a specific orientation, and thus shall not be understood as limiting the disclosure.

In the description of the disclosure, "several" means one or more, and "a plurality of" means two or more. "Greater than", "less than", and "more than" are understood to exclude the following number, while "above", "below" and "within" are understood to include the following number. If first and second are described, it is used for the purpose of distinguishing between the technical features only, and cannot be understood as indicating or implying relative importance, or implicitly indicating the number of technical features indicated thereby, or implicitly indicating the order of technical features indicated thereby.

In the description of the disclosure, unless otherwise clearly defined, words such as setting, installation, connection, and the like, shall be understood broadly, and those of ordinary skills in the art can reasonably determine the specific meanings of the above words in the disclosure in combination with the specific contents of the technical solution.

The take-off and landing apparatus for a vertical take-off and landing aircraft provided according to the disclosure comprises a take-off and landing pole 3, a mooring transfer base 4 and a sleeve docking device 1, wherein a top of the take-off and landing pole 3 is provided with an elastic contact head 2, the mooring transfer base 4 is disposed on the take-off and landing pole 3 and is movable along the take-off and landing pole 3, the mooring transfer base 4 is configured to receive the vertical take-off and landing aircraft 6, the sleeve docking device 1 is disposed on the vertical take-off and landing aircraft 6, and the sleeve docking device 1 is provided with a docking hole 13 adapted to the take-off and landing pole 3.

It should be understood that the vertical take-off and landing aircraft 6 referred to in the disclosure may be either a large manned aircraft or a cargo aircraft, or a small rotor unmanned aerial vehicle. The vertical take-off and landing aircraft 6 may generate a large air flow during operation, and the vertical take-off and landing aircraft 6 may also generate noise during operation. When the vertical take-off and landing aircraft 6 is close to the ground, the interaction between air flow and the ground may raise dust and generate turbulence, which not only reduces the use experience of the vertical take-off and landing aircraft 6, but also may interfere with the operation of the vertical take-off and landing aircraft 6. Meanwhile, as the approach of the vertical take-off and landing aircraft 6, the decibel of noise heard by people nearby is also increasing gradually.

According to the take-off and landing apparatus for a vertical take-off and landing aircraft provided in the disclosure, the mooring transfer base 4 firstly moves upward along the take-off and landing pole to receive the vertical take-off and landing aircraft 6 during landing, then the vertical take-off and landing aircraft 6 stops after the completion of receiving, the vertical take-off and landing aircraft 6 is brought by the mooring transfer base 4 to move downward. The vertical take-off and landing aircraft 6 is transferred to a high place via the mooring transfer base 4 when taking off, and start to take off. By providing the take-off and landing pole 3 and the mooring transfer base 4, the vertical take-off and landing aircraft 6 can start or stop at a position away from the ground during take-off and landing, thereby reducing the impact of airflow and noise on the environment during take-off and landing.

The vertical take-off and landing aircraft 6 may land approximately according to the following steps of: first, controlling the vertical take-off and landing aircraft 6 to align the take-off and landing pole 3 with the sleeve docking device 1, then landing the vertical take-off and landing aircraft 6, docking the sleeve docking device 1 with the take-off and landing pole 3 to complete the initial positioning of the vertical take-off and landing aircraft 6, and moving the mooring transfer base 4 upward along the take-off and landing pole to receive and hold the vertical take-off and landing aircraft 6, and stopping the vertical take-off and landing aircraft 6, and finally, moving the mooring transfer base 4 downward after the vertical take-off and landing vehicle 6 stops. The elasticity of the contact head 2 can play a buffering role in avoiding rigid collision between the sleeve docking device 1 and the take-off and landing pole 3 during docking, so as to ensure smooth docking, and prolong the life of the take-off and landing apparatus for a vertical take-off and landing aircraft.

The contact head 2 may have different designs. For example, in some embodiments, the contact head 2 is made of a rubber material, so that the contact head 2 is elastic by using suitable materials. Alternatively, in some embodiments, the contact head 2 uses a buffering airbag 2', so that the contact head 2 is elastic by inflating the airbag.

In some embodiments, the mooring transfer base 4 and the sleeve docking device 1 are provided with locking mechanisms 10 adapted to each other. When the vertical take-off and landing aircraft 6 is moored on the mooring transfer base 4, the locking mechanism 10 may lock the vertical take-off and landing aircraft 6 to avoid accidents caused by strong winds or other factors during the take-off and landing.

In some embodiments, the mooring transfer base 4 is provided with a base actuator 9, and the base actuator 9 drives the mooring transfer base 4 to move along the take-off and landing pole 3. The base actuator can drive the mooring transfer base 4 to move up and down via a variety of specific actuators. For example, in some embodiments, the take-off and landing pole 3 is provided with a base guide rail 14, the mooring transfer base 4 is provided with a friction wheel 11, the base actuator 9 is connected with the friction wheel 11 in a transmission manner, and the base guide rail 14 is adapted to the friction wheel 11. The base actuator 9 drives the friction wheel 11 to rotate, so as to drive the mooring transfer base 4 to move up and down.

According to some embodiments of the disclosure, the docking hole 13 comprises a guide portion 12 with a pore diameter greater than a diameter of the take-off and landing pole 3, and the pore diameter of the guide portion 12 is reduced gradually. The arrangement of the guide portion can facilitate the alignment of the take-off and landing pole 3 with the sleeve docking device 1 during docking, reduce the operation complexity during landing, and improve the user experience. For example, as shown in FIG. 1, the guide portion 12 can be in the shape of a tapered horn mouth.

According to some embodiments of the disclosure, the take-off and landing pole 3 is made of a composite fiber material. The composite fiber material can improve the strength of the take-off and landing pole 3 and reduce the weight, thus improving the structural stability of the take-off and landing pole 3.

Figure 3:
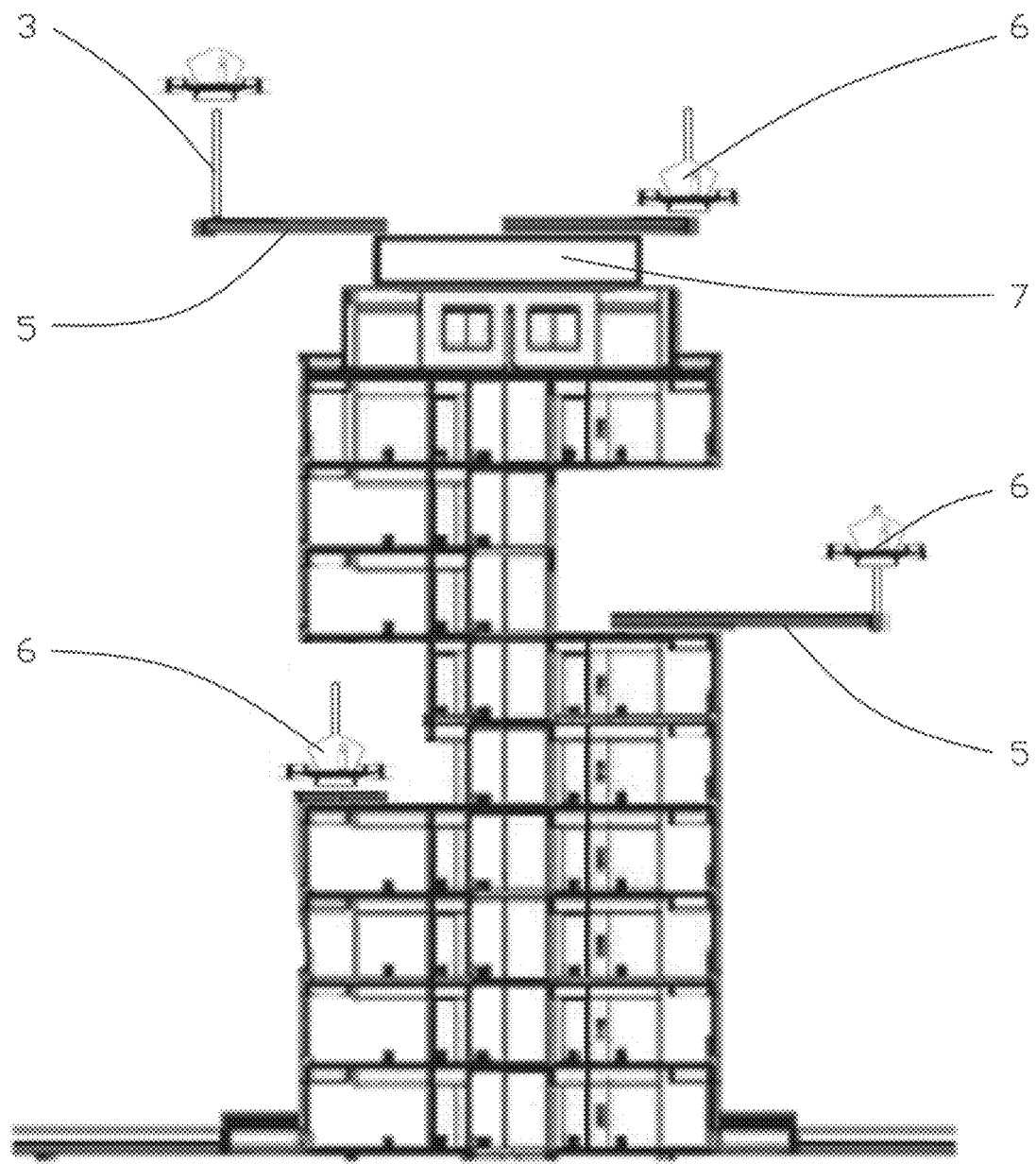
FIG. 3 is a schematic view of usage scenario of the take-off and landing apparatus for a vertical take-off and landing aircraft provided in the disclosure.

According to some embodiments of the disclosure, the take-off and landing apparatus for a vertical take-off and landing aircraft comprises a main platform 7 and at least one support arm 5. The support arm 5 is disposed on the main platform 7, the take-off and landing pole 3 is disposed on the support arm 5, and the support arm 5 can move relative to the main platform 7 to make the take-off and landing pole 3 close to or far away from the main platform 7. It should be understood that due to the limited land use conditions in the urban central areas, the numerous building's roof equipment and the limited space, it is necessary to design appropriate structures to provide the take-off and landing conditions for the large vertical take-off and landing aircraft 6. As shown in FIG. 3, by setting the take-off and landing pole 3 close to or far away from the main platform 7, the take-off and landing apparatus for a vertical take-off and landing aircraft can be disposed on the side of the building, and the main platform 7 is located indoors. The take-off and landing pole 3 is extended out during take-off and landing, and the take-off and landing pole 3 is retracted after take-off and landing, so that the side space of the building can be fully adopted. By sharing the main platform 7 with a plurality of support arms 5, the vertical take-off and landing aircraft 6 can be taken off from a plurality of different positions, and the space utilization efficiency of the take-off and landing apparatus for a vertical take-off and landing aircraft can be improved. To be specific, the mooring capacity of the vertical take-off and landing aircraft 6 on the main platform 7 may be less than the number of the support arms 5 disposed on the main platform 7. A plurality of vertical take-off and landing aircrafts 6 may land on the support arms 5 at the same time, and then transfer to the main platform 7 in batches to carry out the exchange of personnel and goods on the main platform 7 in turn. The vertical take-off and landing aircraft 6 which finish exchanging may be transferred to take off again to make room for the subsequent vertical take-off and landing aircraft 6.

The movement of the support arm 5 relative to the main platform 7 can be either linear movement or swinging. In some embodiments, the main platform 7 is provided with a support arm actuator 8, and the support arm actuator 8 is connected with the support arm 5. The support arm actuator 8 drives the support arm 5 to move.

Figure 2:
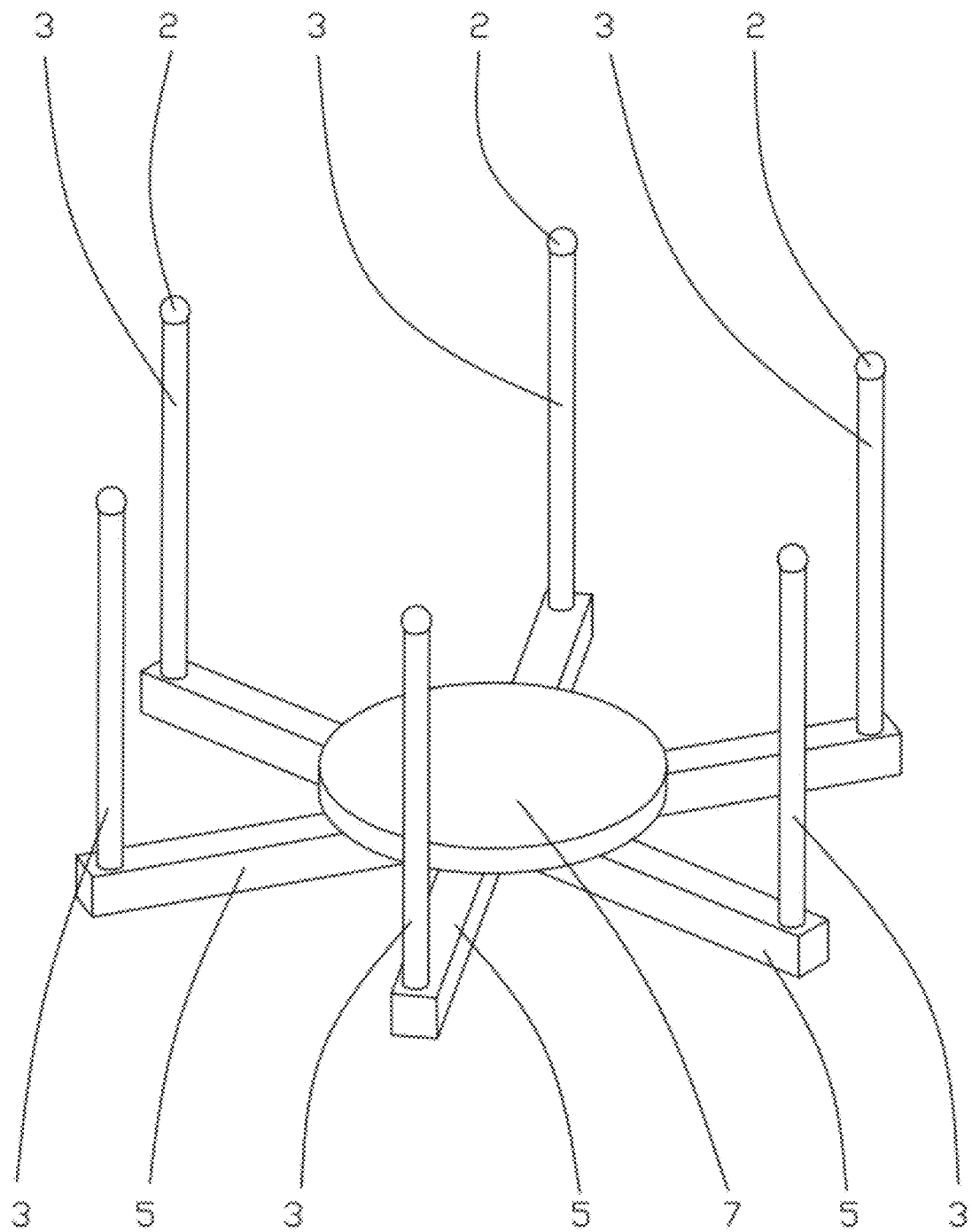
FIG. 2 is a schematic view of layout of a multi-support arm of the take-off and landing apparatus for a vertical take-off and landing aircraft provided in the disclosure.

The take-off and landing apparatus for a vertical take-off and landing aircraft provided according to the disclosure is described in details with reference to FIG. 1, FIG. 2 and FIG. 3 in a specific embodiment. It is worth understanding that the following description only gives illustrative description, rather than a specific limitation to the disclosure.

The take-off and landing apparatus for a vertical take-off and landing aircraft comprises the main platform 7, the support arm 5, the take-off and landing pole 3, the mooring transfer base 4 and the sleeve docking device 1.

The take-off and landing pole 3 is disposed on the support arm 5, the support arm 5 is disposed on the main platform 7, the main platform 7 is provided with the support arm actuator 8, the support arm actuator 8 is connected with the support arm 5, and the support arm 5 is driven by the support arm actuator 8 to move the take-off and landing pole 3 close to or away from the main platform 7. The main platform 7 is provided with a plurality of support arms 5.

The top of the take-off and landing pole 3 is provided with the contact head 2, the take-off and landing pole 3 is provided with the base guide rail 14, the mooring transfer base 4 is disposed on the take-off and landing pole 3, the mooring transfer base 4 is provided with the base actuator 9 and the friction wheel 11, and the base actuator 9 is connected with the friction wheel 11 in a transmission manner. The base guide rail 14 is adapted to the friction wheel 11, and the base actuator 9 can drive the friction wheel 11 to rotate, thereby driving the mooring transfer base 4 to move up and down along the take-off and landing pole 3. The mooring transfer base 4 is configured to receive the vertical take-off and landing aircraft 6.

The sleeve docking device 1 is disposed on the vertical take-off and landing aircraft 6, the sleeve docking device 1 is provided with the docking hole 13 adapted to the take-off and landing pole 3, the docking hole 13 comprises a guide portion 12, and the guide portion 12 may be in a shape of tapered horn mouth. The mooring transfer base 4 and the sleeve docking device 1 are provided with locking mechanisms 10 adapted to each other.

The contact head 2 is made of a rubber material, and the take-off and landing pole 3 is made of a composite fiber material.

Take-off includes the following steps of:
  take-off step 1: enabling passengers or loads into the vertical take-off and landing aircraft 6 through the main platform 7, locking the relevant cabin, and sending out an inspection completion signal A after various systems of the vertical take-off and landing aircraft 6 complete static self-inspection;
  take-off step 2: after receiving the inspection completion signal A from the vertical take-off and landing aircraft 6, extending out the support arm 5, and pushing the vertical take-off and landing aircraft 6 to a take-off position via the support arm 5;

take-off step 3: performing rotor start-up self-inspection of the vertical take-off and landing aircraft 6, and sending out a start-up inspection completion signal B after successful self-inspection;

take-off step 4: after receiving the inspection completion signal B sent out by the vertical take-off and landing aircraft 6, slowly moving the mooring transfer base 4 upward from the bottom of the take-off and landing pole 3, and holding the vertical take-off and landing aircraft 6 to the top of the take-off and landing pole 3;

take-off step 5: after the vertical take-off and landing aircraft 6 reaches the top of the take-off and landing pole 3, sending out a waiting take-off signal C, unlocking the vertical take-off and landing aircraft 6 by the mooring transfer base 4 in due time according to air traffic control information and sending out a permission take-off signal D after receiving the signal C;

take-off step 6: after the vertical take-off and landing aircraft 6 receives the signal D, starting a take-off program, and rapidly increasing a rotor lift, vertically moving upward from the mooring transfer base 4 and separating from the take-off and landing pole 3 to complete the take-off program after the lift is enough to take off.

Landing includes the following steps of:

landing step 1: sending out a landing request signal by the vertical take-off and landing aircraft 6, extending the support arm 5 out of the main platform 7, and guiding the vertical take-off and landing aircraft 6 to perform a landing approach program;

landing step 2: hovering the vertical take-off and landing aircraft 6 above the take-off and landing apparatus for a vertical take-off and landing aircraft, positioning the airborne sleeve docking device 1 above the take-off and landing pole 3 by the vertical take-off and landing aircraft 6 by means of millimeter wave radar, laser or optical identification manner;

landing step 3: slowly landing the vertical take-off and landing aircraft 6, and continuously correcting the relative position of the sleeve docking device 1 to the take-off and landing pole 3 in the landing process to ensure that the error between a center point of the sleeve docking device 1 and the take-off and landing pole 3 is less than the difference between the radius R at the bottom of the horn mouth of the sleeve docking device 1 and the radius r of the take-off and landing pole 3;

landing step 4: after the bottom of the horn mouth of the sleeve docking device 1 of the vertical take-off and landing aircraft 6 contacts with the top end of the take-off and landing pole 3, slowly landing the vertical take-off and landing aircraft 6 and passively correcting the position until the take-off and landing pole 3 being fully inserted into the sleeve docking device 1;

landing step 5: further landing the vertical take-off and landing aircraft 6 until the take-off and landing pole 3 completely penetrating the sleeve docking device 1, sending out a successfully docking signal by the vertical take-off and landing aircraft 6, moving the mooring transfer base 4 upward to lock with the sleeve docking device 1 of the vertical take-off and landing aircraft 6, and sending out a successfully locking signal after successfully locking;

landing step 6: after receiving the successfully locking signal by the vertical take-off and landing aircraft 6, shutting an engine down, and then holding the vertical take-off and landing aircraft 6 by the mooring transfer base 4 to continue to descend to the bottom of the take-off and landing pole 3 to complete the landing;

landing step 7: retracting the support arm 5, pushing the vertical take-off and landing aircraft 6 into a parking position via the support arm 5, so that the passengers or loads exit the cabin from the parking position.

The take-off and landing apparatus for a vertical take-off and landing aircraft according to the embodiments of the disclosure at least can realize the functions as follows by adopting the above design: by providing the take-off and landing pole 3 and the mooring transfer base 4, the vertical take-off and landing aircraft 6 can start or stop at a position away from the ground during take-off and landing, thereby reducing the impact of airflow and noise on the environment during take-off and landing.

In the description of this specification, the description referring to the terms "one embodiment", "some embodiments", "schematic embodiments", "examples", "specific examples", or "some examples" means that the specific features, structures, materials, or characteristics described in conjunction with the embodiment or example are included in at least one embodiment or example of the disclosure. In this description, the schematic expressions of the above terms do not necessarily refer to the same embodiments or examples. Furthermore, the specific features, structures, materials or characteristics described may be combined in an appropriate manner in any one or more embodiments or examples.

Although the embodiments of the disclosure have been shown and described herein, those of ordinary skills in the art may understand that a variety of changes, modifications, replacements and modifications may be made to these embodiments without departing from the principle and purpose of the disclosure. The scope of the disclosure is defined by claims and equivalents thereof.

What is claimed is:

1. A take-off and landing apparatus for a vertical take-off and landing aircraft, comprising:
   a take-off and landing pole, a top of the take-off and landing pole being provided with a contact head which is elastic;
   a mooring transfer base disposed on the take-off and landing pole, the mooring transfer base being movable along the take-off and landing pole, and the mooring transfer base being configured to receive the vertical take-off and landing aircraft; and
   a sleeve docking device disposed on the vertical take-off and landing aircraft, and the sleeve docking device being provided with a docking hole adapted to the take-off and landing pole, wherein a diameter of the docking hole is greater than a diameter of the take-off and landing pole, the docking hole comprises a guide portion, and the diameter of the docking hole tapers so that the guide portion is in a shape of a tapered horn mouth;
   wherein the mooring transfer base and the sleeve docking device are provided with locking mechanisms adapted to each other, and the locking mechanisms are configured to lock the mooring transfer base and the sleeve docking device after the vertical takeoff and landing aircraft is successfully docked with the take-off and landing pole and the mooring transfer base ascends and receives the vertical take-off and landing aircraft.

2. The take-off and landing apparatus for a vertical take-off and landing aircraft according to claim 1, wherein the mooring transfer base is provided with a base actuator, and the base actuator is configured to drive the mooring transfer base to move along the take-off and landing pole.

3. The take-off and landing apparatus for a vertical take-off and landing aircraft according to claim 2, wherein the take-off and landing pole is provided with a base guide rail, the mooring transfer base is provided with a friction wheel, the base actuator is connected with the friction wheel in a transmission manner, and the base guide rail is adapted to the friction wheel.

4. The take-off and landing apparatus for a vertical take-off and landing aircraft according to claim 1, wherein the contact head is made of a rubber material.

5. The take-off and landing apparatus for a vertical take-off and landing aircraft according to claim 1, wherein a buffering airbag is used as the contact head.

6. The take-off and landing apparatus for a vertical take-off and landing aircraft according to claim 1, wherein the take-off and landing pole is made of a composite fiber material.

7. The take-off and landing apparatus for a vertical take-off and landing aircraft according to claim 1, wherein the take-off and landing apparatus for a vertical take-off and landing aircraft comprises a main base plate and at least one support arm, the support arm is disposed on the main base plate, the take-off and landing pole is disposed on the support arm, and the support arm is configured to linearly move or swing relative to the main base plate to enable the take-off and landing pole to reciprocate relative to the main base plate.

8. The take-off and landing apparatus for a vertical take-off and landing aircraft according to claim 7, wherein the main base plate is provided with a support arm actuator, and the support arm actuator is connected with the support arm and drives the support arm to linearly move or swing relative to the main base plate.

* * * * *